US009081802B2

(12) United States Patent
Loeb et al.

(10) Patent No.: US 9,081,802 B2
(45) Date of Patent: Jul. 14, 2015

(54) SYSTEM AND METHOD FOR CREATING A CUSTOMIZED DIGITAL IMAGE (75) Inventors: Michael R. Loeb, New York, NY (US); Edward J. McCabe, Yonkers, NY (US)

(73) Assignee: LOEB ENTERPRISES, LLC, New York, NY (US)

( * ) Notice: Subject to any disclaimer, the term of this patent is extended or adjusted under 35 U.S.C. 154(b) by 420 days.

(21) Appl. No.: 13/371,343

(22) Filed: Feb. 10, 2012

(65) Prior Publication Data

US 2012/0144282 A1   Jun. 7, 2012

Related U.S. Application Data (63) Continuation of application No. 11/701,623, filed on Feb. 2, 2007, now Pat. No. 8,136,028.

(51) Int. Cl.
*G06F 17/30* (2006.01)
*G06Q 30/02* (2012.01)

(52) U.S. Cl.
CPC .... *G06F 17/30268* (2013.01); *G06F 17/30864* (2013.01); *G06Q 30/0241* (2013.01)

(58) Field of Classification Search
CPC ................... G06F 17/30259; G06F 17/30876; G06F 17/30882; G06F 21/36; G06F 3/048; H04N 21/8583; H04N 21/8586
USPC ......................................... 715/200–202, 205
See application file for complete search history.

(56) References Cited

U.S. PATENT DOCUMENTS

| | | | | |
|---|---|---|---|---|
| 6,223,190 B1* | 4/2001 | Aihara et al. | ................. | 715/234 |
| 6,233,591 B1* | 5/2001 | Sherman et al. | .............. | 715/205 |
| 6,931,603 B2* | 8/2005 | Boegelund | ................... | 715/846 |
| 6,959,424 B1* | 10/2005 | Gardner et al. | ............... | 715/853 |
| 7,831,917 B1* | 11/2010 | Karam | ........................... | 715/753 |
| 2001/0029465 A1* | 10/2001 | Strisower | ........................ | 705/14 |
| 2001/0054086 A1* | 12/2001 | Miyahira | ....................... | 709/218 |
| 2002/0010757 A1* | 1/2002 | Granik et al. | ................. | 709/218 |
| 2002/0054059 A1* | 5/2002 | Schneiderman | ............. | 345/700 |
| 2003/0112267 A1* | 6/2003 | Belrose | ........................ | 345/728 |
| 2004/0249709 A1* | 12/2004 | Donovan et al. | ................ | 705/14 |
| 2005/0021677 A1* | 1/2005 | Musha et al. | .................. | 709/218 |
| 2005/0076051 A1* | 4/2005 | Carobus et al. | ............... | 707/102 |
| 2006/0156283 A1* | 7/2006 | Landau et al. | ................ | 717/114 |
| 2006/0271389 A1* | 11/2006 | Goodman | ........................ | 705/1 |
| 2007/0073581 A1* | 3/2007 | Kempe et al. | ................... | 705/14 |
| 2007/0091093 A1* | 4/2007 | Li et al. | ......................... | 345/473 |
| 2007/0130002 A1* | 6/2007 | Moran et al. | .................... | 705/14 |
| 2007/0168249 A1* | 7/2007 | Echard | ........................... | 705/14 |

(Continued)

OTHER PUBLICATIONS

Microsoft FrontPage 2003 Image Maps: Creating Hotspots; Sep. 29, 2004; University of Wisconsin—Eau Claire; pp. 1-5.*

*Primary Examiner* — Andrew Dyer (74) *Attorney, Agent, or Firm* — Buckley, Maschoff & Talwalker LLC (57) ABSTRACT There are provided methods and systems for providing viewers of a digital image with information about identifiable and scenes within the image. In an embodiment, digital images, uploaded to a host website, are customized through the incorporation of some number of selectable informational links and other text based information to provide viewers of the image real-time access to social and advertising related information regarding certain identifiable objects and scenes in the image. The selectable information links are incorporated within and around the digital image in a process referred to herein as image tagging.

20 Claims, 7 Drawing Sheets

(56) References Cited

U.S. PATENT DOCUMENTS

| | | | |
|---|---|---|---|
| 2007/0208610 A1* | 9/2007 | Pisaris-Henderson et al. | 705/10 |
| 2007/0250376 A1* | 10/2007 | Ozawa et al. | 705/10 |
| 2007/0250768 A1* | 10/2007 | Funakami et al. | 715/521 |
| 2008/0005103 A1* | 1/2008 | Ratcliffe et al. | 707/5 |
| 2008/0010263 A1* | 1/2008 | Morton | 707/4 |
| 2008/0082405 A1* | 4/2008 | Martinez et al. | 705/14 |
| 2008/0082905 A1* | 4/2008 | Martinez et al. | 715/205 |
| 2008/0091723 A1* | 4/2008 | Zuckerberg et al. | 707/104.1 |
| 2008/0114762 A1* | 5/2008 | Fukuda et al. | 707/6 |
| 2008/0141110 A1* | 6/2008 | Gura | 715/207 |
| 2008/0181225 A1* | 7/2008 | Zampiello | 370/390 |
| 2008/0184117 A1* | 7/2008 | Alsbury et al. | 715/719 |
| 2008/0222295 A1* | 9/2008 | Robinson et al. | 709/227 |
| 2009/0116704 A1* | 5/2009 | Shah et al. | 382/118 |

* cited by examiner

Fig. 7

SYSTEM AND METHOD FOR CREATING A CUSTOMIZED DIGITAL IMAGE

CROSS-REFERENCE TO RELATED APPLICATIONS

The present application is a continuation application of an application filed on Feb. 2, 2007 and assigned U.S. patent application Ser. No. 11/701,623 now U.S. Pat. No. 8,136,028.

BACKGROUND

1. Field of the Invention

The present invention relates generally to the dissemination of information, and more particularly to a system and method for presenting supplemental information to viewers of a digital image about various objects and scenes included in the image.

2. Background of the Invention

With the expansion of the Internet as a social tool, the number and types of sites that facilitate social networking and information sharing have greatly increased. Among the most popular of these sites include those that provide the ability to create a unique profile that link to a social network (MYSPACE and FRIENDSTER), those that provide online picture albums (FLICKR) and those that allow users to create a "blog" (BLOGSPOT) that might be accessed by any individual with internet access. The exact form and function of these sites vary, however they all tend to provide some means of establishing an individual page or set of pages, and allow a user to connect their page or pages to those of other users in some form of a network. One nearly ubiquitous feature of these types of sites is that they provide the ability of a user to put on display various photos either embedded within a page or within a gallery. It is standard on these pages for advertisements, generally in the form of a banner or text, to appear in the area around the picture. These advertisements are typically either sold by the individual or the host site, and are targeted primarily based upon a user's profile characteristics, text on the web page or browsing history of the viewer.

Certain social networking sites, such as FLICKR, which is a digital photo-sharing website and web-services suite, allow users to "tag" a photograph or areas of a photograph with a word or words. These photo tags provide an easy and convenient way of exploring FLICKR's photograph database by navigating among related keywords (tags) which people attach to photos for easy navigation to pictures with similar content. Further, these photo-level tags, related to an entire photograph, provide for targeting of advertising. FLICKR also provides users with the option to write comments related to individual areas of a photograph, however these area specific comments do not provide informational links or provide the basis for advertisement targeting.

In recent years, several web sites that provide for photo-tagging have arisen. For example, a user of FACEBOOK, a commercially available site, allows members to identify other members within photos. This is accomplished by pointing to an area of the photo and associating an area with the name (and profile) of another member of the site, where the other member is generally selected from a network of friends. It further allows members to scribe a brief description of the picture to convey information the uploader deems appropriate. The photo tagging methodology utilized by the site is meant to provide an informational tool for viewers to navigate between profiles, rather than a tool for the site to target advertisements. As the system is not set up for advertising or information sharing purposes beyond simple social networking, it does not provide a means to identify inanimate objects. As such, a related drawback is that it does not provide for links based upon those inanimate objects or scenes. Further differences between this functionality and the functionality of the present invention include a lack of provision for saving profiles linked to the fundamental picture properties. As a consequence, identical photos uploaded by two friends do not have equivalent tags.

Another photo-tagging site that has recently arisen is RIYA, which is a commercially available site. The site enables users to search the existing reservoir of Internet pictures for objects. Specifically, it provides a search tool which allows users to identify an area (e.g., object, face) and find similar areas (objects, faces) across the available database of pictures. It further allows users to fine-tune the results based upon picture properties such as color, shape and texture of the photograph. The site also provides a "Personal search service" that allows users to train a search engine to come to recognize faces common within a user's pictures. It is premised that by honing the ability to recognize the faces of common subjects of pictures, the sharing of photographs is facilitated. The search/photo tagging methodology employed at the RIYA site is purposed differently from the present invention and thus, when considering RIYA tagging functionality from an informational linking and advertising perspective, it suffers from a number of drawbacks. Specifically, the methodology employed fails to describe a system of creating relevant and interesting tags that contain commentary and links, some of which will be paid for by advertisers. The RIYA system does not provide for the monetization of tags through advertisement and the processes whereby consumers are enabled to help create that information and link those associations. Other limitations include, a lack of pop-up tag as a means of creating a "point to reference" tool or side-bar media space that is chosen at least in part based upon information provided by the user or links chosen by the user, restricted use of a tool box when selecting areas of a photograph, no provision for allowing users to define areas and select the linked information, no provision for integrating the site functionality with a "blog" or personal website or commercial website and no provision for allowing a third party processor to provide advertising based on picture content.

What is desired therefore is a system and method that creates new approaches to social networking, creates new streams of targeted advertising revenue and improves the targeting logic of existing streams of advertising revenue by allowing users to provide information related to objects and scenes within a digital image.

SUMMARY

The present invention addresses these and other problems in the prior art by providing methods and systems for providing viewers of a digital image, information about identifiable objects and scenes within the image via selectable information links. In an embodiment, digital images, uploaded to a host website, are customized through the incorporation of some number of selectable informational links and other text based information to provide viewers of the image real-time access to social and advertising related information regarding certain identifiable objects and scenes in the image. Unlike the prior art, which merely provides users with the option to write comments related to individual areas of a displayed image, such as a photograph, the present invention provides a unique method of providing viewers of a digital image the ability to dynamically access a host of information resources, in real-time, related to certain identifiable objects and scenes in the image. Access to the information resources is achieved primarily through the selectable information links incorporated within and around the digital image in a process referred to herein as image tagging.

In an embodiment, certain of the incorporated informational links, which pertain to certain objects and scenes in a customized digital image, are classified as socially oriented informational links. The socially oriented informational links are intended to serve a social function in that they are chosen to be optimally relevant and interesting to viewers, primarily on a social level. Certain other informational links, incorporated within and around the periphery of a customized digital image, which pertain to certain objects and scenes in a customized digital image, are classified as advertising oriented informational links. These links comprise a form of targeted advertising directed to the viewers of the customized digital image.

In the described embodiment, the socially oriented informational links are displayed to viewers within the image using well-known image rollover techniques and are not subject to change between viewing instances at the host website. In contrast, the advertising oriented informational links may or may not be changed between viewing instances at the host website. In the case where the advertising links change between viewing instances, these links may change over the course of days, weeks or other time periods. In the preferred embodiment, the advertising links are displayed within the image using the afore-mentioned image rollover techniques and also around the periphery of the image in the form of banner ads.

In the described embodiments, the invention provides techniques for customizing a digital image through the creation and association of the socially oriented and advertising oriented informational links with certain pre-selected identifiable objects and scenes in the image. The customization process or technique of associating links with objects and scenes of an image is sometimes referred to herein as "tagging."

According to one aspect of the invention, a method for displaying supplemental information to viewers of a digital image comprises the steps of: (a) associating at least one selectable informational link with a corresponding identifiable object or scene in the digital image to produce a customized digital image; (b) displaying the customized digital image to a viewer; and (c) said viewer selecting the at least one selectable informational link; and (d) retrieving information, responsive to said selection, from an address included in said viewer selected information link that identifies a location of content on a wide area network, wherein said content pertains to said identifiable object or scene corresponding to said viewer selected informational link.

According to another aspect of the invention, different entities, acting jointly or individually, may perform the tagging procedure for linking information resources to various objects and scenes of a digital image. In an embodiment, the owner, who may also be the author of the digital image, may perform the tagging procedure. In certain embodiments, the host site website, hosting the digital images, could perform the tagging procedure automatically using well known system software processes. These processes are typically based on well-known pattern recognition techniques to scan an uploaded digital image to identify one or more areas of a digital image, or the entire image, that might contain an identifiable object or scene.

According to yet another aspect of the invention, once a digital image has been customized via the tagging procedure, the incorporated tags (i.e., informational links and other information) may be displayed to viewers of the digital image in various ways. One way of displaying the incorporated tags to viewers is by using well known roll-over techniques to display pop-up windows displaying the tags. Another way of displaying the tags is by displaying links around the periphery of the digital image in the form of banner and text-based advertisements. Another way of utilizing the incorporated links is to use them as a means for selecting the banner advertisements and/or text-based advertisements positioned on the page on which the image is displayed. In various embodiments, these display techniques may be used in any reasonable combination including being used as a complement to current standards for targeting advertisements.

The present invention provides numerous advantages over the prior art. A primary advantage is a system and method that creates new streams of targeted advertising revenue and improves the targeting logic of existing streams of advertising revenue by allowing users to provide information related to objects within a digital image. Such a system provides the impetus for consumers to provide new information about areas of an image and allow them the ability to choose links to be associated with the area, to the end of creating a set of links and information which is most relevant and interesting to viewers. A further related advantage is that such a system allows advertisements to be sold by the host site not only based on profile characteristics, text on a web page or browsing history of the viewer, but based on the content of images that viewer has elected to view. Implemented properly, the system provides a tool for users to quickly and easily identify products or locations, and find out more information or execute some kind of consumer transaction based on that information. Once such functionality has been established, users might learn to look for such tags within photographs in order to find out more information about products or scenes contained within the image. This is seen as particularly valuable in the case that an individual that displays images and creates tags is a popular "blogger" or popular member of a social network, and where appearance with a certain object, and further identification of such object by the individual produces a tacit endorsement that might spur consumer interest to find out more information and potentially purchase said object. An additional advantage is that the tag data provides a basis for selling additional targeted ad space in the same form as the informational links, and may provide additional information to replace or complement current methods for the targeting of existing advertisements.

DESCRIPTION OF THE DRAWING FIGURES

These and other objects, features and advantages of the present invention will be apparent from a consideration of the following Detailed Description of the invention, when considered in conjunction with the drawing Figures, in which.

DETAILED DESCRIPTION OF THE INVENTION

The present invention is directed to methods and systems for displaying supplemental information via informational links and text-based information to viewers of a digital image. Unlike prior art approaches that target online advertising which appears on the same page as digital images based on user profile characteristics, text displayed on the same page as the image or potentially browsing history of the viewer, the present inventors have devised a novel approach to targeted online advertising and social networking that provides for the association of information related to image content with areas of a photo or the entire photo and the targeting of advertisements based on the content of the digital image. Such a system might either be used to be the sole means of selecting the right advertisement for a particular page or might supplement current standards targeting in order to select advertisements that are relevant not only for the viewer based on their own profile, but also based on the content of the images they are currently viewing. Further, the system provides for the implementation of a new media space beyond standard banner advertisements and text-based advertisements, that would provide image viewers the ability to scroll over objects within a photo and receive information and links associated with such area or object, effectively training them that they can point to certain objects to find more information or purchase options.

As used herein examples and illustrations are exemplary and not limiting.

System Overview

Figure 1:
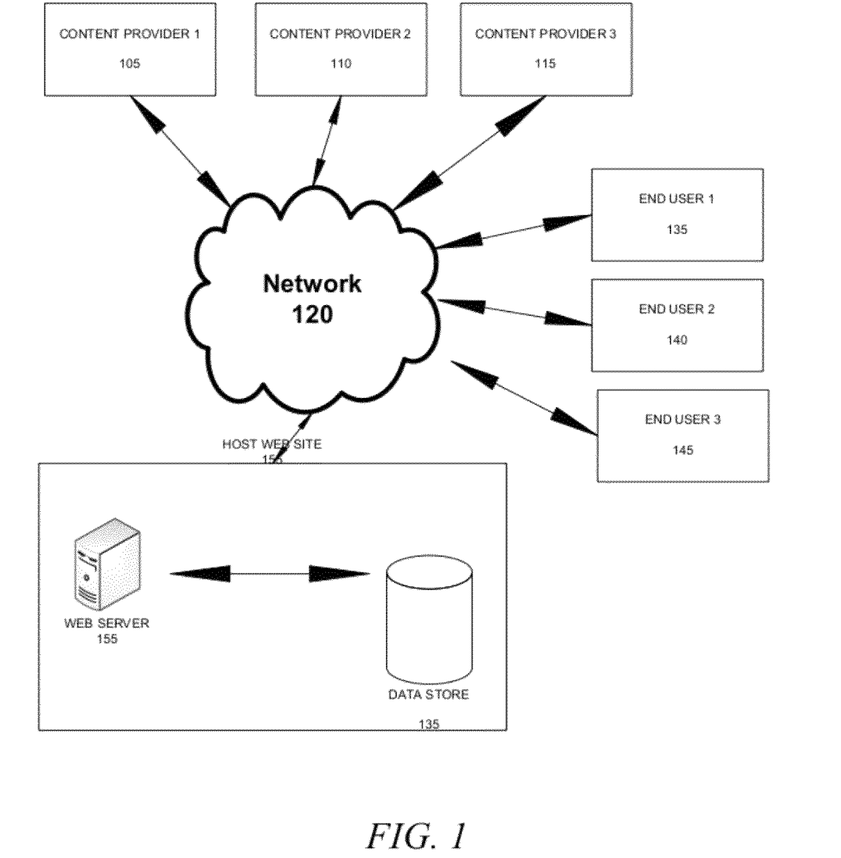
FIG. 1 is a block diagram of a system according to an embodiment of the present invention.

FIG. 1 presents a block diagram of a system according to an embodiment of the present invention. As shown, the system includes a host web site 155 including a web application server 125 coupled to a data store 135 for storing customized digital content, a plurality of content providers 105-115 (three are shown) and a plurality of content viewers 135-145 (three are shown). The content providers 105-115 and content viewers 135-145 are coupled to the host web site 155 via network 120. The content providers 105-115 upload digital content (e.g., a digital image) to the host web site 155 via network 120. The uploaded digital content may comprise, without limitation, digital still photos, frames of digital video, scanned images, digitized analog images, and any similar type of digital image. Content providers 105-115 are intended to include, without limitation, an individual, a group of individuals, a business, or an organization. A processor contained within the web application server 125 of the host web site 155 is configured to receive and customize the digital content uploaded from the content providers 105-115.

Customization of a digital image is a two step process. First, the digital image is tagged by a user. Tagging comprises identifying one or more socially oriented links, in a manner to be described below, and incorporating the identified links into pop-up windows associated with certain user selected objects and scenes of the digital image. These socially oriented links may also appear in text form around the periphery of the digital image. In the second stage of the process, keywords are identified which are offered to sale to advertisers. The keywords are used by the advertisers to place advertisements which may appear in the same pop-up windows referred to above and may also be used to dictate the form and function of banner ads, which appear around the periphery of the digital image.

[A] Tagging

Figure 2:
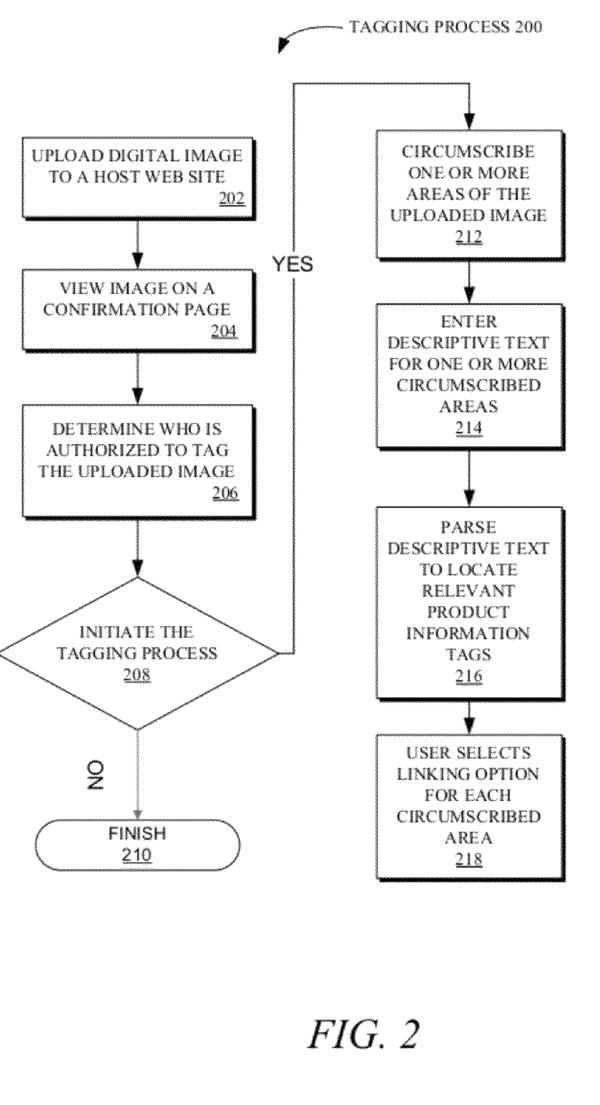
FIG. 2 there is shown a tagging process for presenting product and other information about objects and scenes in a digital image, according to one embodiment.
Figure 3:
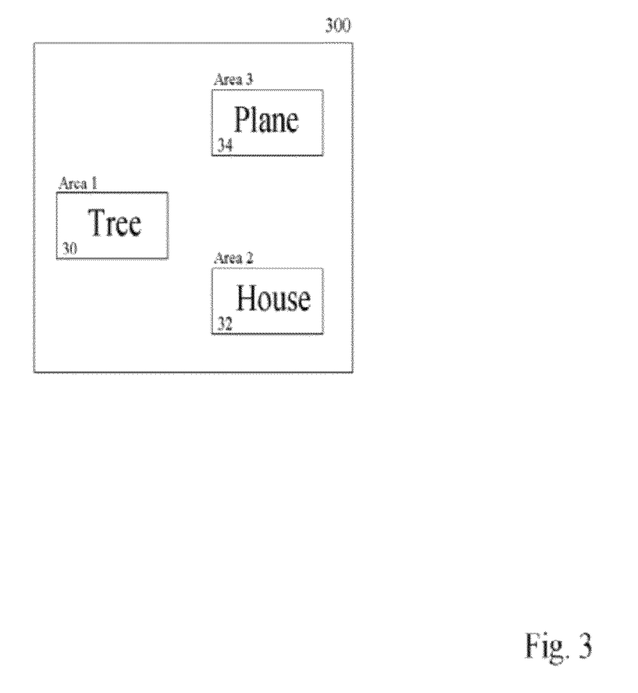
FIG. 3 illustrates a screen shot of an exemplary digital image which has been uploaded by a content provider to a host web site.

A process is now described, with reference to FIGS. 1-3 for tagging a digital image, referred to herein as tagging.

With reference now to FIG. 2, there is shown a tagging process 200 for incorporating socially oriented links for various objects and scenes included in an uploaded digital image, according to one embodiment. The tagging process is preferably executed by the web application server 125 of the host web site 155.

At step 202, a given content provider 105, who may be the publisher (author) of the digital image, uploads one or more digital images to a host web site 155 which supports the uploading and display of digital content, including digital images. By way of example, there is shown in FIG. 3, an exemplary digital image 300 which has been uploaded by a content provider 105 to a host web site 155. For the sake of clarity, the exemplary digital image is simplified to the extent that it is comprised of various textual representations (proxies) of objects and scenes which may be found in a conventional digital image.

At step 204, the content provider 105 is given the option of viewing the uploaded digital image on a confirmation page.

At step 206, the content provider 105, determines those entities that are to be granted authorization to tag the uploaded digital image 300 (see FIG. 3). Determining which entities are to be granted authorization may be implemented via a system query requesting that the content provider 105 identify the authorized entities, or potentially set as a default option that the user might change via "privacy settings", which are well known. The authorized entities may include, for example, anonymous viewers of the digital image at the host web site 155, friends of the content provider 105, or some combination of each. The content provider 105 has the option of electing not to extend authorization rights to any entity and thereby retain such authorization privileges exclusively. As a further option, the content provider 105 may grant authorization rights exclusively to a system administrator of the host web site 155.

At determination step 208, the content provider 105, is queried by the system to determine whether the content provider 105 wishes to initiate the tagging process for the currently uploaded digital image 300. This step may be implemented via a system query including a dialogue box requiring a "yes/no" response. In the event the content provider 105 decides not to initiate the tagging process, by providing a "no" response to the system query, the tagging process is terminated at step 208. Otherwise, the tagging process is initiated at step 212.

At step 210, the tagging process terminates and the uploaded digital image 300 is incorporated into the database 135 of the host web site 155 in a conventional manner without being tagged.

Figure 4:
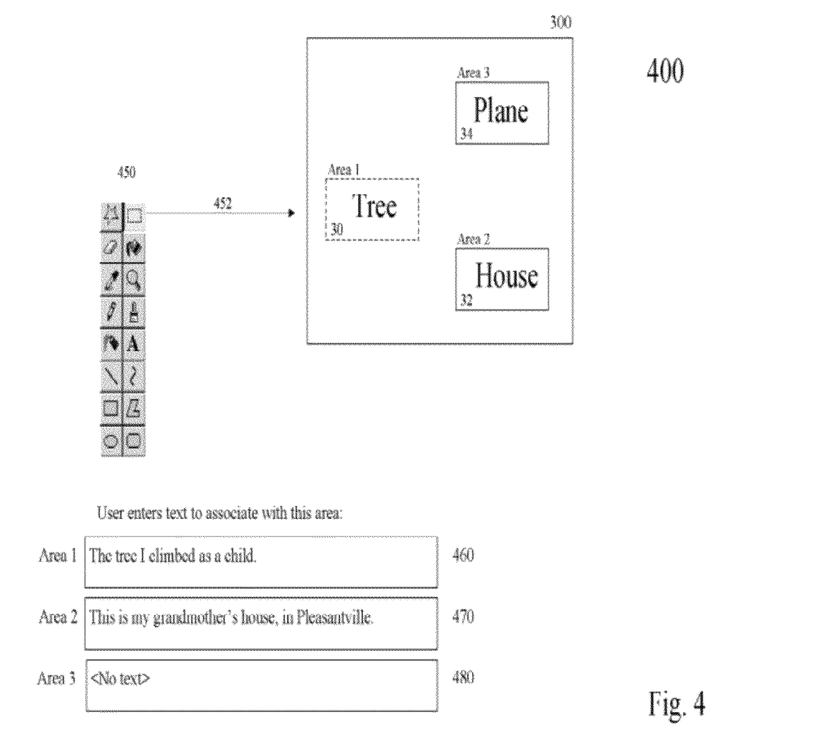
FIG. 4 illustrates a screen shot of the exemplary digital image in which the content provider identifies and circumscribes areas around objects and scenes of interest in an uploaded digital image.

At step 212, initiation of the tagging process begins with the content provider 105 identifying specific objects and scenes of interest in the uploaded digital image 300 and circumscribing an area around each object and/or scene of interest. In the present illustrative example, as shown in FIG. 4, the content provider 105 identifies three objects of interest and circumscribes an area around each object, i.e., areas 1, 2 and 3. The three circumscribed areas 1, 2 and 3 surround a tree 30, a house 32 and a plane 34, respectively. It should be appreciated that the act of circumscribing an area of interest in the digital image 300 may be performed in any manner known to those having ordinary skill in the art. For example, in the screen display illustrated in FIG. 4, a marquee tool 452, selected from the system palette 450, is used to circumscribe the areas 1, 2 and 3 of the uploaded digital image 300. It should be understood that there is no limitation regarding the shape or size of a circumscribed area, as long as the circumscribed area is within the boundaries of the digital image 300.

At step 214, the content provider 105 is provided with the option of entering descriptive text for each circumscribed area 1, 2 and 3. As shown in FIG. 4, this step may be implemented in one way via text entries entered into text entry boxes 460, 470 and 480, associated with areas 1, 2 and 3, respectively. In the first text entry box 460 of the screen display of FIG. 4, a line of text is entered describing the tree image 32 circumscribed in area 1. The text entry comprises—The tree I climbed as a child. In the second text entry box 470, a line of text is entered describing the house 32 circumscribed in area 2. The text entry comprises—This is my grandmother's house, in Pleasantville. As shown, no text entry is made for area 3 of the digital image 300.

At step 216, for each text entry made by the content provider 105 for a given circumscribed area, the system parses the entered text to extract nouns and verbs as keys to identifying relevant product information tags for the image in the circumscribed area. It is noted that the content provider 105 has the option of electing to enter a single descriptive word as a text entry. In this case, the system uses the single descriptive word as a key or index for searching a database comprised of a plurality of keywords to locate relevant links.

In one embodiment, in lieu of using user-defined text, as described above, a content provider 105 may directly search a database comprised of a plurality of common images to identify images which are highly correlated to the images circumscribed in the uploaded digital image 300. Each image in the database would include an associated set of tags, composed of keywords and social links.

At step 218, with reference now to FIG. 5, the content provider 105 is presented with a linking option window 502 directly below the uploaded digital image 300 for determining the manner in which the various circumscribed images (e.g., tree 30, plane 32, house 34) and/or scenes displayed in the digital image 300 are to be linked to the product information tags identified at step 216. In the presently described embodiment, the user is presented with two linking options, described in detail below.

In the presently described embodiment, the content provider 105 is given the option of choosing one of two linking options to link the various tags identified at step 216 with a corresponding circumscribed area. As shown in FIG. 5, a linking option may be selected by checking a corresponding check box in the linking option window 502.

Figure 5:
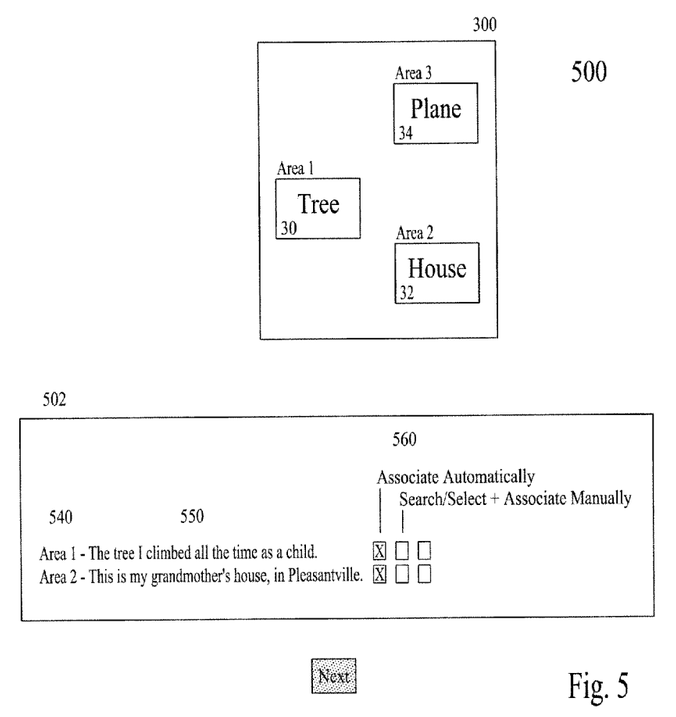
FIG. 5 illustrates a screen shot of the exemplary digital image in which the content provider is presented with a linking option window below the exemplary uploaded digital image for determining the manner in which various circumscribed images are linked to the product information tags.

As shown in FIG. 5, the linking option window 502 includes three columns. A first column, referred to herein as an area identifier column 540, for identifying the circumscribed area (e.g., areas 1, 2 and 3) to be linked to one or more product information tags. A second column, referred to herein as a text description column 550 listing the descriptive text for each circumscribed area. A third column, referred to herein as a linking column 560, for selecting a linking option for each circumscribed area. The two linking options provided in linking column 560 are respectively labeled—Option (1)—"Associate Automatically" and Option (2)—"Search/Select and Associate Manually"

Linking Option (1)—"Associate Automatically"

The first linking option, Associate Automatically, shifts the responsibility for associating a tagged area with relevant, interesting links from the user of the system to the system or site host. In accordance with this linking option, the user implicitly gives the system permission to utilize all available information to populate user-created photo tags of a given circumscribed area with relevant links. One way in which the system may utilize all available information to populate photo tags with relevant links is to use the text data (see text description column 550) describing each circumscribed area. The descriptive text may, when parsed into keywords, in certain cases, be sufficient to identify relevant links. In some cases, the descriptive text may represent a starting point for identifying relevant links. In the case where the user has not provided any text, or in the case where the descriptive text is insufficient, but is a good starting point, the system may scan the digital image 300 in its entirety using image recognition technology to identify matches with an existing information database of images and associated keywords. Object and scenes that can be matched to existing database records are associated with the same keywords as the original record, providing the basis to determine the most appropriate and most resonant links. Alternately, the system might rely on paid individuals trained in categorizing tags, identifying objects, describing scenes, choosing keywords and choosing links to be associated with the tag.

In one embodiment, the user implicitly gives the system permission to utilize all available information to scan the entire photograph and create new tags within the picture, without the user having circumscribed an area. One way in which the system may utilize all available information to create new tags is to use scan the digital image 300 in its entirety using image recognition technology to identify matches with an existing information database of images. Those objects and scenes that can be identified and matched with photographs of known content are tagged by the system, where objects and scenes in the picture are selected by the system (circumscribed), and keywords associated with those matched objects on record are associated with the new tag. After creating a new tag, the system would select relevant social links per the above-described process.

In one embodiment, identifying relevant links may include giving primary weight or consideration to those objects and associated keywords that are shown to be within the circumscribed area and giving secondary weight or consideration to certain objects and associated keywords outside of the circumscribed region. By giving some weight to images outside of the circumscribed area, individual objects, ages of people, groups of people, and the like may prove helpful in determining the most appropriate and most resonant links.

In another embodiment, the circumscribed area may be considered exclusively without giving any consideration or weight to regions (images) outside of the circumscribed area of the digital image to determine the most appropriate and most resonant links.

Linking Option (2)—"Search/Select and Associate Manually"

In the case where the user wishes to assert more control over the process of link selection, a second linking option is provided, referred to herein as, Search/Select and Associate Manually 560. In accordance with this second linking option, a user is provided with a search bar tool (not shown) to facilitate the entry of a search term related to an object or scene in a given circumscribed area. For example, this second linking option is selected by the content provider 105 for circumscribed area 32 in the present illustrative example by checking the Search/Select and Associate Manually checkbox for Area 2 in FIG. 5.

In accordance with this second linking option, a user-entered search term or terms is used to search for relevant links in a similar manner to how a Google™ search is performed. In response to the user entering his or her search term, a search query is performed in which the user receives a list of links related to the entered search term. The user may select one or more links, or no links, from among the returned list as relevant links for association with the given circumscribed area. In an alternate embodiment, instead of using a search bar with results, the user may navigate through a directory, browsing through various categories, to find relevant links. Results of either such search, either by search term or through a directory, might be provided within categories, for example those links that provide historical information, reference information, media citations, and geographic information.

It should be noted that in the case where a user does not explicitly choose Linking Option (2)—"Search/Select and Associate Manually" the system may utilize Linking Option (1)—"Associate Automatically" by default. However, it should be appreciated that for the sake of maximum relevance to the end viewer, the selection of information links by the user through Linking Option (2) results in more personalized and thus interesting links for the end viewer. Thus, the user may be encouraged to select links via Linking Option (2). However, if the user is reluctant to do so, then as a backup, the system may utilize the process articulated in Linking Option (1) by default.

[B] Incorporating Advertising Links in a Tagged Digital Image

The process described above with reference to the flowchart of FIG. 2 was directed to the first step of customization, i.e., tagging. The following description pertains to the second step of customization directed to the addition of one or more advertising links in the form of pop-up windows and banner ads. This second step of customization utilizes the socially oriented links identified in the first customization step, in a manner to be described below.

Recall from the tagging process described above, with particular reference to step 216, for each text entry made by the content provider 105 for a given circumscribed area, the system parsed the text entry to extract nouns and verbs as keys for identifying relevant product information tags for a given image in the circumscribed area. For the purpose of identifying relevant advertising links, these extracted keywords are heretofore referred to as primary keywords. The set of primary keywords, derived during the tagging procedure, are used as input to a type of computer software, well known in the art as a "Spider" or "Crawler", to identify a set of secondary keywords. As is well known, search engines include, at least one spider or crawler application which crawls across the Internet gathering content information, and populating a database with this information, which is organized in the form of an index or catalogue. In accordance with the presently described process for incorporating one or more advertising links in and around a digital image, the "Spider" or "Crawler" software is programmed to scan a set of resources, such as, for example, the content of pages selected as the socially-oriented links, which were identified by the tagging procedure. The socially-oriented links comprise a set of addresses that identify the location of content on a wide area network, such as the Internet. More particularly, the "spider" or "crawler" software application is configured to extract a set of common keywords from the socially linked pages, using the primary keywords as drivers of this process, where the spiders look principally for major themes conveyed on socially linked pages beyond those primary keywords contained within some number of characters of those primary keywords. Those keywords that appear most often would be considered a secondary set of keywords. The set of primary and secondary keywords are made available for sale to advertisers, as described in greater detail below.

In another embodiment, the system employs regression analysis techniques to determine general themes contained on a webpage (e.g., the socially oriented links) to provide a set of secondary keywords that correlate most highly with such themes.

Identifying a set of secondary keywords is now described by way of example as follows. Assume that a particular digital image includes an image of a blue house on a hillside overlooking a brook. Typical tagged images may include—the house and the brook. A content provider may provide descriptive text describing the tagged house as—"a blue tudor home with a wrap-around porch." A set of primary keywords which may be extracted from this description might include {blue, tudor, home, porch}. The image tags might also provide social links that the user selects, which provide additional information about the image, for example such a page might identify the house's geographic location on a map, provide a page related to the municipality in which the house is located or a page containing an article related to the architectural style of the house. As described above, a spider would review the content and extract keyword information from the pages comprising the social links, looking primarily for words that appear within some number of characters of primary keywords. An analysis of these words is performed based on repetition, or other well known techniques in the information arts, to find the mostly highly correlated words, which would be counted as a secondary list of keywords.

While spidering and regression analysis have been described, numerous other methods will be known to the readers for developing taxonomies of related keywords.

Keywords, both primary and secondary, would be made available for sale to advertisers, who upon purchasing one or more words, include their links, either as text within the pop-up box, text on the page or as a banner advertisement. In an embodiment, the keywords may be sold to advertisers in an auction type format. Alternatively, the sale may be conducted on a first come, first serve basis. Of course, other well-known methods of selling advertisements are within contemplation of the invention.

In an embodiment, it is contemplated to establish a mechanism for marketing the advertising related links (tags) for sale to advertisers who may be interested in purchasing the tags to create new streams of targeted advertising revenue and improve the targeting logic of existing streams of advertising revenue. In this manner, an advertiser would own a portion of the display space associated with a purchased tag. To facilitate a marketplace directed to the sale of advertising tags, a third party database may be utilized, including system software configured to provide a report of the number of instances a keyword or highly correlated keyword appears, traffic (number of viewers) of pictures that contain such tags and associated keywords and potentially historical conversion (click-through) on ads that are positioned related to these keywords. In this way, the system might quote advertisers the potential size of the traffic in a manner that would allow them to choose the number of keywords they would like to purchase and amount of money to allocate to purchasing such keywords.

It should be appreciated that the identified links may be identified by any number of well known link identification mechanisms, known in the art, such as, for example, a Uniform Resource Locator (URL), a Uniform Resource Identifier, an Internet Protocol (IP) address, a file transfer protocol ("FTP") address.

In one embodiment, identifying relevant links may include giving primary weight or consideration to those objects and associated keywords that are shown to be within the circumscribed area and giving secondary weight or consideration to certain objects and associated keywords outside of the circumscribed region. By giving some weight to images outside of the circumscribed area, individual objects, ages of people, groups of people, and the like may prove helpful in determining the most appropriate and most resonant links.

Displaying the Customized Digital Image

What has been described thus far is a tagging process in which social and advertising links and other information is associated with a digital image to produce a customized image for display to viewers at a host website, such as host website 155.

Figure 6:
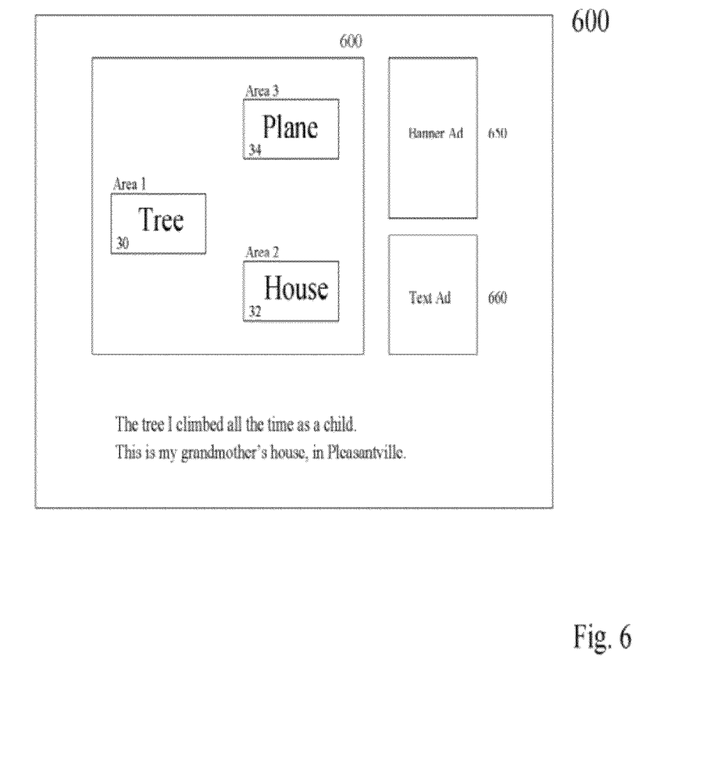
FIG. 6 illustrates a screen shot of an uploaded and tagged digital image 600, tagged in accordance with the tagging process.
Figure 7:
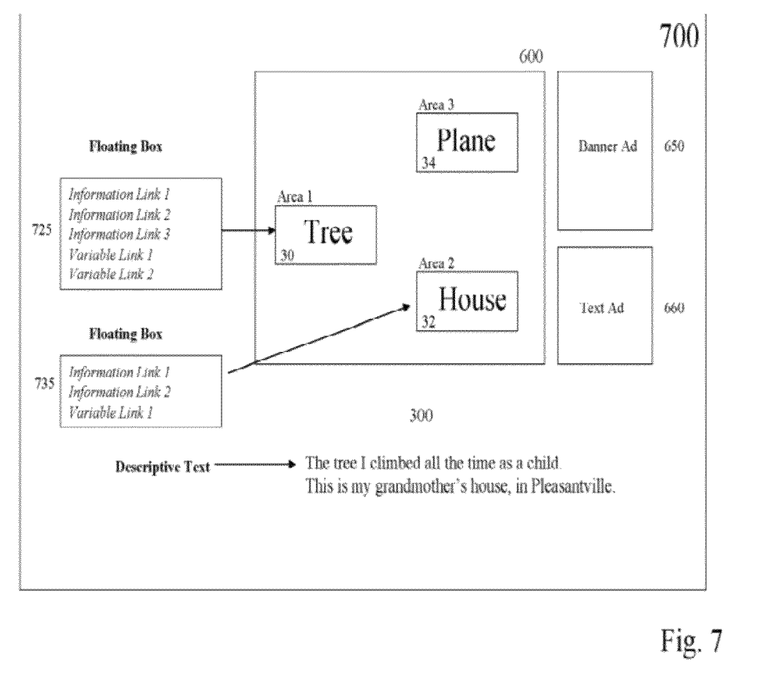
FIG. 7 illustrates a result of a viewer scrolling a cursor over one or more of the circumscribed areas in the tagged digital image of FIG. 6.

FIGS. 6 and 7, illustrate, an exemplary customized digital image, made available for viewing at a host website.

With reference now to FIG. 6, in accordance with the present illustrative example, there is shown a screen shot of an uploaded and tagged digital image 600, tagged in accordance with the tagging process, described above. The exemplary screen shot 600 is divided into three general areas. The first area includes the tagged digital image 600 comprised of the three circumscribed areas 1, 2 and 3, selected in accordance with step 210. It should be understood that the boundaries of the circumscribed areas 1, 2 and 3, are transparent to the viewer and are shown here for the sake of clarity. Directly below the tagged digital image 600, there is a second area including the descriptive text selected in accordance with step 212.

To the right of the screen shot 600 there is shown a third general area of the screen display including banner and text ads. In particular, there is shown a banner ad 650 which is one form of link related to one or more of the circumscribed areas 30, 32 and 34. Directly below the banner ad 650, there is shown a text ad 660 which is another form of link related to one or more of the circumscribed areas 30, 32 and 34.

With reference now to FIG. 7, there is shown a result of a viewer scrolling a cursor over two of the circumscribed areas 1, 2 in the tagged digital image 600. In general, when a viewer scrolls a cursor over a circumscribed area, a pop-up window (i.e., floating box) appears on the display including certain links. For example, when a viewer scrolls over circumscribed area 1 in the screen display of FIG. 7, pop-up window 725 appears on the screen display, including three (3) social links which were identified during the tagging process in accordance with the first linking option, i.e., Associate Automatically, described above. In addition to these three (3) social links, two (2) additional advertising links are shown.

Continuing with FIG. 7, when an end user scrolls over another circumscribed area 2, pop-up window 735 appears on the screen display including two social (2) links. These two (2) links were identified during the tagging process in accordance with the second linking option, Search/Select and Associate Automatically, described above. As above, one (1) additional advertising link is displayed here as well.

In different embodiments of the invention, the banner and text ads may change in content or type as different links are activated or even between sequential activations of the same link.

It is noted that viewers of the uploaded digital images (e.g., photos), who may be members of the hosting web site 155, may perform the operative steps for selecting links to be associated with circumscribed areas. This is in contrast to the previously described embodiment in which the content providers (authors) of the digital images perform the operative steps for selecting links to be associated with the circumscribed areas.

Viewers may provide tags in a number of different ways, including, for example, providing tags in a "wiki" manner. As is well known to those in the art, a wiki is a web site comprised of the perpetual collective work of many authors. It is similar to a blog in structure and logic, however, a wiki, extends the blog model by allowing anyone to edit, delete or modify content that has been placed on the Web site using a browser interface, including the work of previous authors. The term wiki typically refers to either the Web site or the software used to create the site. In such a model, the viewer might be given the ability to circumscribe areas of a photo and write associated short descriptions. Further, the viewer might choose the appropriate links to be associated with such text or the system might use viewer-created text as a basis for selecting the appropriate links, toward the end of providing the most informative, interesting and relevant links possible.

Storing the Customized Digital Image

Subsequent to circumscribing an area of an image and selecting the appropriate links to be associated with the circumscribed areas in the manner described above, the system links or associates the tags to the digital image and stores the information in a data repository. The process of linking or associating the identified tags with a digital image may be performed in a number of different ways including coordinate linking and pixel pattern linking, each of which are described as follows.

Coordinate Linking

In one embodiment, the photo tags may be linked with an uploaded digital image using coordinate data. In particular, the coordinate data may be used for describing ranges within the image. For example, the five (5) product information tags of pop-up window 725 of FIG. 7 may be linked to the digital image 300 using an x-y coordinate range (e.g., x—2.5 mm to 4 mm, y—6 mm to 6.5 mm). The coordinate range data can scale up and down in proportion to the size of the display. It is noted that the coordinate data describes numerical ranges without considering the actual image content. In other words, the particular pixel patterns are irrelevant to the coordinate linking method.

In operation, when a record is created for a given digital image, the record preferably includes coordinate data for each circumscribed area within the image. Whenever a viewer scrolls his or her mouse across the digital image, a software process determines whether the current pointer position is within the boundaries of a circumscribed area, as defined by the associated coordinate data. If so, the photo tags linked to the coordinate data are retrieved from memory to be displayed inside of a pop-up window.

Pixel Pattern Linking

In another embodiment, information related to the customization of photos is directly linked to the pixel patterns of the digital image. In this embodiment, when a record is created for a given digital image, a sample of the pixel area corresponding to each circumscribed region is stored as part of the record. Whenever a viewer scrolls his or her mouse across the digital image, a software process performs a database search to find a corresponding pre-stored pixel pattern. The correspondence may be computed to within a pre-determined confidence level (e.g., 100%, 90%, etc.). In the event that a match is found to be within a prescribed tolerance level, associated tags, which are pre-stored as part of the identified database record are linked with the image. The benefit of this functionality is that data provided by a user such a descriptive text and selected links endures for all copies of identical or nearly identical photographs, and is not limited solely to the tagged instance of the photo.

Compensation Based on Tagging Behavior

In accordance with an embodiment of the present invention, the person (e.g., content provider, viewer) that tags a digital image 300 can be part of a distribution structure and receive compensation or other incentives from a host web site 155 for tagging the digital image 300. It is contemplated that the tagging process will generate an increase in the number of clicks advertisements surrounding a picture as a result of the improved targeting, and will create entirely new clicks on links within the pop-up boxes related to objects within a photo tag. For these incremental clicks, the host web site might generate incremental revenue. For example, for a tagged digital image, the host web site may generate twenty dollars per month, which may be ten dollars above what the same image might have produced (in terms of revenue) without the tagging information. Given the expected increase in advertising revenue, the host site might provide users incentive or reward to provide tagging information in the form of a share of incremental revenue associated with that tag. Such rewards or compensation encourages other users and viewers to tag their digital image in a similar manner, improving the quality of content available to all visitors of the host web site. In an embodiment, the tagged photo may be licensed for use by other users such as other web sites.

In an alternate embodiment, a user that provides the digital image and creates the tags might also own the advertising space associated with the image (as might be the case if the user has developed their own domain with a personal "blog"). While in previously described embodiments, the user provides a digital image and a host website sells advertisements based upon the content of the digital image, under this embodiment they might use the invention together with a text based advertising system, such as Google, AdSense, for example, that places banner advertisements based upon page content, in order to further the selection of such text based advertisements.

In one embodiment, the targeted advertising links may be identified and selected during the tagging process based upon one or more observed behaviors of a particular viewer. In the prior art, the selection of banner and text ads are typically based upon an established viewer preference, as indicated by viewer profile information and/or browser history. In this embodiment, the idea of generating targeted advertising links based on viewer preference is extended by observing which advertisements a particular viewer expresses an interest in, by observing which tags a particular viewer views and then clicks through. Advertisements are then chosen in future images which comport with the particular viewer's tag-usage history, in the same way a browser history or information in a personal profile information is utilized. For example, a digital image may include an image of an automobile and a boat. It is observed that a particular viewer expresses a preference for selecting links associated with the automobile. Thus, based on the observed behavior of that particular viewer, a future digital image may be customized to emphasize targeted advertising links directed to automobiles as opposed to boats, where customization primarily means selecting the optimal advertising links from a set of possible advertising links.

In an embodiment, compensation can be provided in accordance with a standard formula to compensate a user or viewer tagging content per incremental click. That is, a base line of standard click rate is first established, and may be periodically re-established thereafter, to validate the incremental clicks created by the tagging process. Once the base rate is established, a compensation system may readily determine what constitutes an incremental click and compensate the user or viewer on this basis.

In another embodiment, a host web site may agree to pay some percentage of their revenue for each incremental click. This rate may adjust along a sliding scale dependent upon a number of variables including, for example, traffic across all of the posted digital images, the content of the digital images, the type of advertisement and conversion of the viewers.

In yet another embodiment, it is contemplated that in certain cases the individual that tags the digital image is different from the content provider of the digital image. In accordance with the present embodiment, it is contemplated to compensate the individual(s) who tag the digital images, who are not the owners of the digital image. For example, if an individual visits a friend's web site and provides information about one or more objects in the digital image. If information provided on that photograph results in the association of product information tags that generate some kind of revenue, then some form of compensation is due to the individual In accordance with one embodiment of the present invention, the compensation system uses payment units, which can be in the form of actual points deposited into an account. However, one skilled in the art will recognize that the implementation details will be similar if money or alternative forms of currency were used instead of points. A user may receive 1 point and a tagger may receive 1 point for each click or impression. Points can then be transacted for goods and services.

While the invention has been shown and described with respect to particular embodiments, it is not thus limited. Numerous modifications, changes and enhancements will now be apparent to the reader.

What is claimed is:

1. A computer based method for creating a customized digital image which provides viewers of the customized digital image with information about objects and scenes displayed within identifiable areas of the customized digital image, the method comprising:
   (a) identifying objects and scenes of interest displayed within identifiable areas of the digital image, wherein the identifiable areas comprise less than the entire digital image;
   (b) identifying one or more product information hyperlinks to be associated with at least one of the identifiable areas of the digital image;
   said step of identifying one or more product information hyperlinks to be associated with at least one of the identifiable areas of the digital image including:
      inputting, by a user, descriptive text that describes certain of the objects and scenes of interest in the identifiable areas of the digital image;
      displaying a linking option window to the user, the linking option window containing a respective plurality of linking options for each of at least some of the identifiable areas;
      receiving indications from the user of selection among said linking options for said at least some of the identifiable areas;
      in response to the user's selection among said linking options, performing a search query based on the descriptive text that was input by the user;
      receiving a list of product information hyperlinks as output from the search query; and
      selecting one or more of the received product information hyperlinks as an identified product information hyperlink;

(c) linking the identified product information hyperlinks with corresponding identifiable areas of the digital image to produce a customized digital image; and (d) displaying the customized digital image to a viewer;

wherein the step of displaying the customized digital image further comprises:

displaying the identifiable areas as a first part of the customized digital image;

displaying the descriptive text as a second part of the customized digital image; and displaying the product information hyperlinks as a third part of the customized digital image and at a location that is different from a location at which the descriptive text is displayed.

2. The method of claim 1, wherein the product information hyperlinks are displayed to a viewer as part of a pop-up window.

3. The method of claim 1, wherein the product information hyperlinks are displayed to a viewer as part of a banner ad.

4. The method of claim 1, wherein certain of the associated product information hyperlinks change between viewing instances.

5. The method of claim 1, wherein said descriptive text comprises one or more keywords.

6. The method of claim 1, wherein said descriptive text comprises a text string.

7. The method of claim 1, further comprising:

(e) receiving, from the viewer, a selection for a given displayed product information hyperlink in said customized digital image, wherein the selection is made in association with one of the identifiable areas of the customized digital image;

(f) retrieving information, from an address included in said viewer selected product information hyperlink that identifies a location of content on an electronic network, and (g) displaying said retrieved information to the viewer.

8. The method of claim 7, wherein the address is one of: (a) a Uniform Resource Locator (URL), (b) a Uniform Resource Identifier, (c) an Internet Protocol (IP) address, (d) a file transfer protocol ("FTP") address.

9. The method of claim 7, wherein the retrieved information is displayed to a viewer whenever the viewer scrolls over one of said identifiable areas in which a user has provided an associated product information hyperlink.

10. The method of claim 1, wherein the objects and scenes of interest in the digital image are associated with the identifiable areas of the digital image by circumscribing an area around each identified object and scene of interest.

11. A system for creating a customized digital image which provides viewers of the customized digital image with information about objects and scenes displayed within identifiable areas of the customized digital image, the system comprising:

a processor;

a memory connected to the processor and storing instructions for operating the processor to perform the steps of:

(a) identifying objects and scenes of interest displayed within identifiable areas of the digital image, wherein the identifiable areas comprise less than the entire digital image;

(b) identifying one or more product information hyperlinks to be associated with at least one of the identifiable areas of the digital image;

the step of identifying one or more product information hyperlinks to be associated with at least one of the identifiable areas of the digital image including:

inputting, by a user, descriptive text that describes certain of the objects and scenes of interest in the identifiable areas of the digital image;

displaying a linking option window to the user, the linking option window containing a respective plurality of linking options for each of at least some of the identifiable areas;

receiving indications from the user of selection among said linking options for said at least some of the identifiable areas;

in response to the user's selection among said linking options, performing a search query based on the descriptive text that was input by the user;

receiving a list of product information hyperlinks as output from the search query; and selecting one or more of the received product information hyperlinks as an identified product information hyperlink;

(c) linking the identified product information hyperlinks with corresponding identifiable areas of the digital image to produce a customized digital image; and (d) displaying the customized digital image to a viewer;

wherein the step of displaying the customized digital image further comprises:

displaying the identifiable areas as a first part of the customized digital image;

displaying the descriptive text as a second part of the customized digital image; and displaying the product information hyperlinks as a third part of the customized digital image and at a location that is different from a location at which the descriptive text is displayed.

12. The system of claim 11, wherein the product information hyperlinks are displayed to a viewer as part of a pop-up window.

13. The system of claim 11, wherein the product information hyperlinks are displayed to a viewer as part of a banner ad.

14. The system of claim 11, wherein certain of the associated product information hyperlinks change between viewing instances.

15. The system of claim 11, wherein said descriptive text comprises one or more keywords.

16. The system of claim 11, wherein said descriptive text comprises a text string.

17. The system of claim 11, further comprising:

receiving, from the viewer, a selection for a given displayed product information hyperlink in said customized digital image, wherein the selection is made in association with one of the identifiable areas of the customized digital image;

retrieving information, from an address included in said viewer selected product information hyperlink that identifies a location of content on an electronic network, and displaying said retrieved information to the viewer.

18. The system of claim 17, wherein the address is one of: (a) a Uniform Resource Locator (URL), (b) a Uniform Resource Identifier, (c) an Internet Protocol (IP) address, (d) a file transfer protocol ("FTP") address.

19. The system of claim 17, wherein the retrieved information is displayed to a viewer whenever the viewer scrolls over one of said identifiable areas in which a user has provided an associated product information hyperlink.

20. The system of claim 11, wherein the objects and scenes of interest in the digital image are associated with the identifiable areas of the digital image by circumscribing an area around each identified object and scene of interest.

* * * * *